United States Patent
Russell, II et al.

(10) Patent No.: US 8,842,802 B2
(45) Date of Patent: Sep. 23, 2014

(54) FUEL RODS FOR NUCLEAR REACTOR FUEL ASSEMBLIES AND METHODS OF MANUFACTURING THEREOF

(75) Inventors: William Earl Russell, II, Wilmington, NC (US); Robert Haughton, Wilmington, NC (US)

(73) Assignee: Global Nuclear Fuel-Americas, LLC., Wilmington, NC (US)

( * ) Notice: Subject to any disclaimer, the term of this patent is extended or adjusted under 35 U.S.C. 154(b) by 922 days.

(21) Appl. No.: 11/581,620

(22) Filed: Oct. 16, 2006

(65) Prior Publication Data
US 2008/0089461 A1 Apr. 17, 2008

(51) Int. Cl.
G21C 3/04 (2006.01)
G21C 3/32 (2006.01)
G21C 3/00 (2006.01)

(52) U.S. Cl.
USPC ............ 376/435; 376/409; 376/426; 376/434

(58) Field of Classification Search
USPC ................. 376/409, 426, 434, 435, 156, 158, 376/170–173
See application file for complete search history.

(56) References Cited

U.S. PATENT DOCUMENTS

| | | | |
|---|---|---|---|
| 4,096,033 A * | 6/1978 | Barry | 376/173 |
| 4,229,258 A | 10/1980 | Takeda et al. | |
| 4,330,367 A | 5/1982 | Musick | |
| 4,629,599 A | 12/1986 | Crowther et al. | |
| 4,683,113 A | 7/1987 | Mochida et al. | |
| 4,692,599 A * | 9/1987 | Howard et al. | 219/532 |
| 5,091,139 A | 2/1992 | Chao et al. | |
| 5,145,635 A * | 9/1992 | Ishii et al. | 376/173 |
| 5,171,516 A | 12/1992 | Iwamoto | |
| 5,198,186 A | 3/1993 | Ogiya et al. | |
| 5,229,068 A * | 7/1993 | Johansson et al. | 376/371 |
| 5,249,211 A * | 9/1993 | Nagano et al. | 376/435 |
| 5,347,550 A * | 9/1994 | Tanabe et al. | 376/173 |
| 5,359,634 A * | 10/1994 | Johannesson | 376/428 |
| 5,367,547 A * | 11/1994 | Hida et al. | 376/435 |
| 5,377,247 A * | 12/1994 | Yoshioka et al. | 376/428 |

(Continued)

FOREIGN PATENT DOCUMENTS

| | | | |
|---|---|---|---|
| JP | 63-221287 A | | 9/1988 |
| JP | 06011585 A | * | 1/1994 |
| JP | 2002-357686 A | | 12/2002 |
| JP | 2004-220595 | | 8/2004 |

OTHER PUBLICATIONS

Notice of Reasons for Refusal issued in connection with JP Application No. 2007-267825, Feb. 5, 2013.

(Continued)

*Primary Examiner* — Bernarr Gregory
(74) *Attorney, Agent, or Firm* — Harness, Dickey & Pierce, P.L.C.

(57) ABSTRACT

A fuel rod for a nuclear reactor includes the fuel rod having a first axial zone positioned proximate to a bottom end, a second axial zone positioned adjacent to the first axial zone in the intermediate region, and a third axial zone positioned proximate to a top end. The first axial zone has an enrichment greater than the second axial zone and the second axial zone has an enrichment greater than or equal to the third axial zone. Also includes fuel assemblies having a plurality of fuel rods and methods of designing and manufacturing of fuel rods and fuel assemblies.

23 Claims, 9 Drawing Sheets

(56) References Cited

U.S. PATENT DOCUMENTS

| | | | |
|---|---|---|---|
| 5,524,128 A | 6/1996 | Mowry et al. | |
| 5,544,211 A * | 8/1996 | Haikawa et al. | 376/435 |
| 5,790,618 A | 8/1998 | Fawks, Jr. | |
| 5,912,933 A | 6/1999 | Shaug et al. | |
| 6,141,396 A * | 10/2000 | Kanda et al. | 376/267 |
| 6,343,106 B1 | 1/2002 | Hiraiwa | |
| 6,504,889 B1 * | 1/2003 | Narita et al. | 376/267 |
| 6,611,572 B2 * | 8/2003 | Bolger et al. | 376/216 |
| 6,674,825 B2 * | 1/2004 | Bolger et al. | 376/216 |

OTHER PUBLICATIONS

Japanese Office Action issued in Japanese Patent Application No. 2007-267825, dated Nov. 29, 2013.

* cited by examiner

Fuel Rod Compositions
Bundle 1

FIG. 7

Rod Position
Bundle 1

Control Blade Corner

| F30 | F2  | F7  | F26 | F6  | F6  | F26 | F7  | F3  | F30 | 1  |
|-----|-----|-----|-----|-----|-----|-----|-----|-----|-----|----|
| F2  | F9  | X4  | F3  | X2  | X3  | F10 | X4  | F10 | F3  | 2  |
| F7  | X4  | X2  | X1  | X6  | X6  | X5  | X1  | G11 | F6  | 3  |
| F26 | F10 | X5  | X6  | X2  | W2  |     | X5  | F10 | F4  | 4  |
| F5  | X2  | X6  | X2  | F9  |     |     | X6  | X7  | F5  | 5  |
| F5  | X3  | X6  | W1  |     | F9  | X8  | X6  | X5  | F6  | 6  |
| F26 | F10 | X5  |     |     | X8  | X5  | X5  | F10 | F4  | 7  |
| F7  | X4  | X2  | X1  | X6  | X6  | X1  | X5  | X9  | F6  | 8  |
| F3  | F9  | G11 | F3  | X7  | X5  | F10 | X9  | F10 | F3  | 9  |
| F30 | F3  | F6  | F5  | F6  | F6  | F5  | F6  | F3  | F30 | 10 |

Column  A  B  C  D  E  F  G  H  J  K

Row

FIG. 8

Fuel Rod Variations By Bundle 1 to 7

FIG. 9

|    | 1 | 2 | 3 | 4 | 5 | 6 | 7 | 8 | 9 | 10 | 11 | 12 | 13 | 14 | 15 | 16 |    |
|----|---|---|---|---|---|---|---|---|---|----|----|----|----|----|----|----|----|
| 1  |56B|   |   |   |   |   |   |   |   |    |    |    |    |    | 2  | 3  | 32 |
| 2  |   |   |   |   |   |   |   |   |   | 4  | 2  | 2  | 5  | 2  | 2  | 1  | 30 |
| 3  |   |   |   |   |   |   |   | 4 | 6 | 5  | 3  | 6  | 4  | 2  | 4  |    | 28 |
| 4  |   |   |   |   | 4 | 4 | 4 | 6 | 4 | 6  | 1  | 5  | 3  | 4  | 4  |    | 26 |
| 5  |   |   |   | 3 | 4 | 4 | 5 | 4 | 7 | 1  | 4  | 4  | 7  | 3  | 2  |    | 24 |
| 6  |   |   | 5 | 4 | 6 | 1 | 2 | 6 | 2 | 2  | 6  | 4  | 4  | 7  | 4  |    | 22 |
| 7  |   |   | 4 | 2 | 4 | 2 | 7 | 6 | 1 | 6  | 2  | 1  | 2  | 2  | 4  |    | 20 |
| 8  |   |   | 6 | 2 | 6 | 5 | 5 | 2 | 2 | 6  | 6  | 6  | 5  | 4  | 6  |    | 18 |
| 9  |   | 6 | 4 | 4 | 6 | 6 | 7 | 6 | 4 | 6  | 4  | 2  | 2  | 2  | 1  |    | 16 |
| 10 |   | 2 | 2 | 2 | 2 | 6 | 2 | 6 | 2 | 2  | 4  | 1  | 2  | 7  | 3  |    | 14 |
| 11 |   | 5 | 4 | 4 | 1 | 3 | 5 | 4 | 6 | 4  | 4  | 4  | 4  | 2  | 1  | 1  | 12 |
| 12 |   | 6 | 2 | 4 | 6 | 6 | 4 | 7 | 4 | 4  | 2  | 2  | 2  | 2  | 2  | 5  | 10 |
| 13 |   | 2 | 6 | 5 | 7 | 2 | 1 | 1 | 4 | 1  | 4  | 3  | 4  | 4  | 4  | 4  | 08 |
| 14 |   | 7 | 4 | 7 | 1 | 4 | 4 | 5 | 1 | 2  | 2  | 2  | 7  | 5  | 7  | 3  | 06 |
| 15 | 2 | 6 | 7 | 2 | 3 | 2 | 2 | 6 | 2 | 2  | 1  | 2  | 4  | 1  | 4  | 6  | 04 |
| 16 | 4 | 2 | 4 | 9 | 3 | 4 | 2 | 7 | 4 | 6  | 7  | 4  | 5  | 3  | 1  | 5  | 02 |
|    |01 |03 |05 |07 |09 |11 |13 |15 |17 |19  |21  |23  |25  |27  |29  |31  |    |

42
42

FUEL RODS FOR NUCLEAR REACTOR FUEL ASSEMBLIES AND METHODS OF MANUFACTURING THEREOF

FIELD

The present disclosure relates to a nuclear reactor and, more specifically, to fuel rods and fuel assemblies for a nuclear reactor core.

BACKGROUND

The statements in this section merely provide background information related to the present disclosure and may not constitute prior art.

In a nuclear reactor, a fissile fuel atom, such as U-235, absorbs a neutron in its nucleus that results in a nuclear disintegration which produces on the average two fission fragments of lower atomic weight with kinetic energy and several neutrons at high energy. In a typical nuclear reactor, fuel is in the form of fuel rods, each of which contains stacked sintered pellets of a nuclear fuel arranged within an elongated cladding tube. Each fuel rod can be of the same length or a different length. Typically, each fuel rod has a fuel enrichment distribution in the vertical/axial direction of the rod and is often designed for a uniform enrichment across the axial length of the rod.

Groups of fuel rods are coupled together and often enclosed within a casing to form fuel bundles (also referred to as fuel assemblies). The fuel assemblies are placed within the reactor core and are supported between upper and lower core plates within the core. A plurality of fuel assemblies are arranged in a matrix to form the nuclear reactor core that is capable of a self-sustained fission reaction.

The kinetic energy of the fission products is dissipated as heat in the fuel rods. Energy is also deposited in the fuel assemblies and moderated by the neutrons, gamma rays, and other radiation resulting from the fission process. During operation of the reactor, water (that serves both as a coolant and as neutron moderator) enters the bottom of the fuel assembly and flows upwards through the fuel assembly past the fuel rods. Heat is given off by the fuel rods and is taken up by the water which boils and is transformed into steam. The coolant (liquid and steam) rise upward through the upper portion of the fuel assembly and the steam exits the top of the fuel assembly where it is collected for delivery to a turbine for generating electrical energy.

As the water and steam rise, the coolant reduces in liquid content and increases in steam content. At the upper portion of the fuel rods, the coolant is primarily steam content. This results in the fuel at the top of the fuel assembly not being utilized as efficiently in the generation of steam from the liquid as the fuel at the bottom of the fuel assembly. Additionally, the higher steam content at the top of the fuel assembly results in less cooling of the fuel rods by the coolant than at the lower portions where the ratio of liquid to steam is higher. If the heat from the fuel rod becomes excessive as compared to the available coolant at the top of the fuels rods, there is a risk of dryout. Additionally, the higher percentage pressure drop from bottom to top of the fuel assemblies and core increases the instability of the core. When there is a higher percentage of steam, the neutron moderation of the coolant is reduced because steam is an inferior moderator compared to water.

During operation, the percentage of steam voids increases towards the top of the reactor, leading to decreased moderation in the top regions of the core and about the fuel rods and assemblies. As such, the power distribution within the reactor core is generally skewed toward the lower regions of the core. It is a known practice to compensate for this by distributing a burnable absorber in an axially inhomogeneous manner and to enrich the uranium in the middle and/or top axial portions of the core. A burnable absorber is a neutron absorber which is converted by neutron absorption into a material of lesser neutron absorbing capability. A number of the fuel rods are often provided with a burnable absorber with a distribution in the fuel rod skewed toward the axial region of hot operating maximum reactivity. A well-known burnable absorber is gadolinium, normally in the form of gadolinia. The burnable absorbers available for use in design have an undesirable end-of-refueling cycle neutron absorption reactivity residual due to residual isotopic neutron absorption by small neutron cross section absorbers. For example, if gadolinium is used as a burnable absorber, the high cross section isotopes (Gd-155 and Gd-157) deplete rapidly but residual absorption remains due to continued neutron capture in the even isotopes (Gd-154, Gd-156, and Gd-158). As such, the use of a burnable absorber is not the most effective or desirable method of reactor core design and results in fuel cycle inefficiencies.

Additionally, when the reactor is in the cold shutdown condition, the top of an irradiated boiling water reactor core is more reactive than the bottom due to greater plutonium production at the top and less U-235 destruction in the top during operation (greater conversion ratio and smaller burnup occurs in the top of the core). In the cold shutdown condition, the steam voids in the upper part of the core are eliminated, thus making the top of the core more reactive than the bottom.

As noted, axial power shaping within the core and fuel assemblies is traditionally provided by including greater amounts of burnable absorber in the lower portions of the reactor core. However, the optimum burnable absorber shaping for full power optimization to maintain a desired shutdown margin is not adequately maintained during cold shutdown. In order to meet cold shutdown margin objectives, it is typically necessary to design fuel assemblies with excess burnable absorber residual that penalizes the initial enrichment and uranium ore requirements, reduces fuel cycle efficiency and therefore increases the fuel cycle cost of the reactor.

A further problem is that available burnable absorbers such as gadolinia reduce the thermal conductivity of the fuel rods and increases fission gas release. Consequently, the gadolinia-containing rods are frequently the most limiting rods in the fuel assembly, and have to be down-rated in power with a correspondingly adverse effect on local power distributions. The amount of power down-rating that is required depends on the gadolinia concentration, but becomes a serious problem in extended burn up fuel bundle designs and/or high energy cycle designs where increased gadolinia concentrations are required in order to provide adequate cold shutdown margins.

Thus, the current methods of axial shaping of fuel assemblies by having higher enrichments in the middle or upper portions and using burnable absorbers in the lower portion have significant negative effects on obtaining optimal core configurations, on fuel cycle efficiencies and on operating costs of a nuclear reactor.

SUMMARY

The inventors hereof have succeeded at designing and producing complex axially varied enriched fuel rods for nuclear reactors. Various embodiments of this disclosure have demonstrated one or more of the following: improved fuel utilization and fuel cycle efficiency, reduced use of non-efficient burnable absorbers, increased plutonium generation at the top of the fuel bundle, reduced top of core leakage, improved fuel loading pattern flexibility, optimize cold shut down margins, increased critical power margins, increased Kw/ft margins, reduced total amounts of uranium and the average enrichment in fuel reloads, and/or reduced overall fuel cycle costs.

According to one aspect, a fuel rod for a nuclear reactor includes a first axial zone positioned proximate to a bottom end, a second axial zone positioned adjacent to the first axial zone in an intermediate region, and a third axial zone positioned proximate to a top end. The first axial zone has an enrichment greater than the second axial zone and the second axial zone has an enrichment greater than or equal to the third axial zone.

According to another aspect, a method of designing a fuel rod for a nuclear reactor includes specifying an enrichment for a first axial zone positioned proximate to a bottom end of a fuel rod to minimize a local peak power, determining an enrichment for a second axial zone positioned adjacent to the first axial zone in an intermediate region of the fuel rod, and determining an enrichment for a third axial zone positioned proximate to a top end of the fuel rod, wherein determining the enrichments for the second and third axial zones are to minimize an R-factor.

According to yet another aspect, a fuel assembly for a nuclear reactor includes a plurality of fuel rods having one or more fuel rods including a first axial zone positioned generally at a bottom end, a second axial zone positioned adjacent to the first axial zone in an intermediate region, and a third axial zone positioned generally at a top end, wherein the first axial zone has an enrichment greater than the second axial zone and the second axial zone has an enrichment greater than or equal to the third axial zone.

According to another aspect, a fuel assembly for a nuclear reactor includes a plurality of fuel rods wherein one or more fuel rods includes a first axial zone positioned generally at a bottom end, a second axial zone positioned adjacent to the first axial zone in an intermediate region, and a third axial zone positioned generally at a top end, wherein the first axial zone is configured to optimize a local peak power of the first axial zone and the second and third axial zones are configured to optimize an R-factor for the fuel assembly.

According to yet another aspect, a method of designing a fuel assembly for a nuclear reactor includes specifying enrichments for a first axial zone of each of a plurality of fuel rods within the fuel assembly to optimize local peak power of the first axial zone, the first axial zone being positioned proximate to a bottom end of each fuel rod, and determining enrichments for a second axial zone and a third axial zone of each of a plurality of fuel rods within the fuel assembly to optimize an R-factor for the fuel assembly, the second axial zone being positioned adjacent to the first axial zone in an intermediate region of each fuel rod, and the third axial zones being positioned proximate to a top end of each fuel rod.

According to still another aspect, a method of manufacturing a fuel rod includes filling a tube with a plurality of first fuel pellets having a first enrichment to a first axial zone length to form a first axial zone positioned generally in a bottom end of the tube and filling the tube with a plurality of second fuel pellets having a second enrichment to a second axial zone length to form a second axial zone with the second enrichment being less than the first enrichment. The method also includes filling the tube with a plurality of third fuel pellets having a third enrichment to a third axial zone length to form a third axial zone with the third enrichment being less than or equal to the second enrichment.

According to still another aspect, a method of manufacturing a fuel bundle for a nuclear reactor wherein the fuel bundle includes a plurality of fuel rods, the method including filling a first tube with a plurality of fuel pellets having a first enrichment to a lower zone length to form a lower axial zone positioned generally in a lower portion of the tube, filling the first tube with a plurality of fuel pellets having a second enrichment to an intermediate axial zone length to form an intermediate axial zone, the second enrichment being less than the first enrichment, and filling the first tube with a plurality of fuel pellets having a third enrichment to an upper axial zone length to form an upper axial zone, the third enrichment being less than or equal to the second enrichment; and filling a second tube with a plurality of the fuel pellets having the first enrichment to a second lower axial zone length to form a second lower axial zone positioned generally in a lower portion of the second tube, a plurality of fuel pellets having the second enrichment to a second intermediate axial zone length to form a second intermediate axial zone, and a plurality of fuel pellets having a third enrichment to a second upper axial zone length to form a second upper axial zone, wherein the second intermediate axial zone length is greater than the first intermediate axial zone length.

Further aspects of the present invention will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

As will be described herein, integrated axial varying enrichment (IAVE) includes fuel rod and fuel bundle design and manufacturing processes where the enrichment distribution changes in the axial direction at multiple elevations or lengths. Traditionally, those skilled in the art have believed that optimal performance of the nuclear reactor was obtained when the top or highest portions of the fuel rods had the highest levels or equivalent levels of enrichment. However, the current inventors have succeeded in designing fuel rods and fuel assemblies with improved operational characteristics through a new integrated axial varying enrichment (IAVE) design having the highest levels of enrichment in the bottom or lower axial portions of the fuel rods and fuel assemblies.

The inventors have demonstrated that various embodiments of the present disclosure have provided improved operating characteristics for fuel rods, fuel assemblies and nuclear reactor cores. For example, their efforts have indicated that by utilizing one or more embodiments of the invention as described herein, core enrichment deltas can be obtained when required for reactor designs that have at least 0.2 between the bottom enrichment zone and a middle enrichment zone, and between the middle enrichment zone and a top enrichment zone. The length or height of each of the enrichment zones is varied in designing fuel rods and fuel assemblies for optimizing fuel cycle performance of the reactor and/or a shaping or smoothing of the enrichment across all or a portion of the axial length of the fuel bundle or core.

Additionally, by incorporating one or more embodiments of the fuel rods in a fuel bundle and core design, the manufacturing of the fuel rods and fuel bundles can be simplified and therefore result in lowered manufactured costs. This can be achieved through the enabled design improvements that can utilize fuel rods with a fewer number of enrichment zones that have integrated axial varying enrichments. For example, in many embodiments the number of enrichment zones and variety of enrichment zones can be significantly reduced over prior practice. In some cases, the varying of heights or zone lengths in the reduced number of enrichment zones can provide sufficient design variations for most, if not all, fuel bundle and core design requirements. Fuel bundles can be designed and manufactured to have several different effective enrichment zones by varying one or more zone lengths of one or more rods within the fuel bundle and by producing a subset of rod zones. As a result, complex fuel bundle enrichment profiles can be designed and produced with significantly simplified individual fuel rods.

In some embodiments, a bottom end axial zone and/or a top axial zone have enrichments equal to the second and/or third axial zones to produce fuel rods or fuel bundles having high enrichment, or can utilize natural uranium to form fuel rods or fuel bundles having a upper or lower section of low enrichment.

The fuel rods and/or fuel bundles as described herein can provide, in some embodiments, fuel bundles with improved local peakings and R-factors, relating to improvements in Kw/ft and critical power (CPR) margins. As known, optimization or improvement of local peakings and R-factors generally include minimizing the local peakings and minimizing the R-factors. For example, fuel bundles consistent with one exemplary embodiment as described herein have demonstrated local peakings that are as low as 1.14 in the lower part of the bundle, also known as the Power Shaping Zone (PSZ). Additionally, other exemplary fuel bundles according to other embodiments have demonstrated R-factors as low as 0.93. As known to those skilled in the art, these levels of local peaking and R-factors are lower than generally considered possible. As a result, a core designed with fuel rods and fuel bundles as described in this disclosure are capable of producing improved kilowatt per foot (Kw/ft) margins and critical power ratio (CPR) margins as compared to fuel rods and fuel bundles having equivalent level of enrichment and therefore fuel cost. As a result, one or more embodiments as described herein can provide for improved fuel cycle efficiency for a nuclear reactor.

Additionally, in some embodiments an end of cycle shape can be lower and less peaked as compared to previous designs. As a result, lower operating limit minimum critical power ratios (OLMCPR) are produced and therefore additional CPR margin can be obtained. This can provide for additional improved fuel cycle efficiency and operational flexibility.

Figure 1:
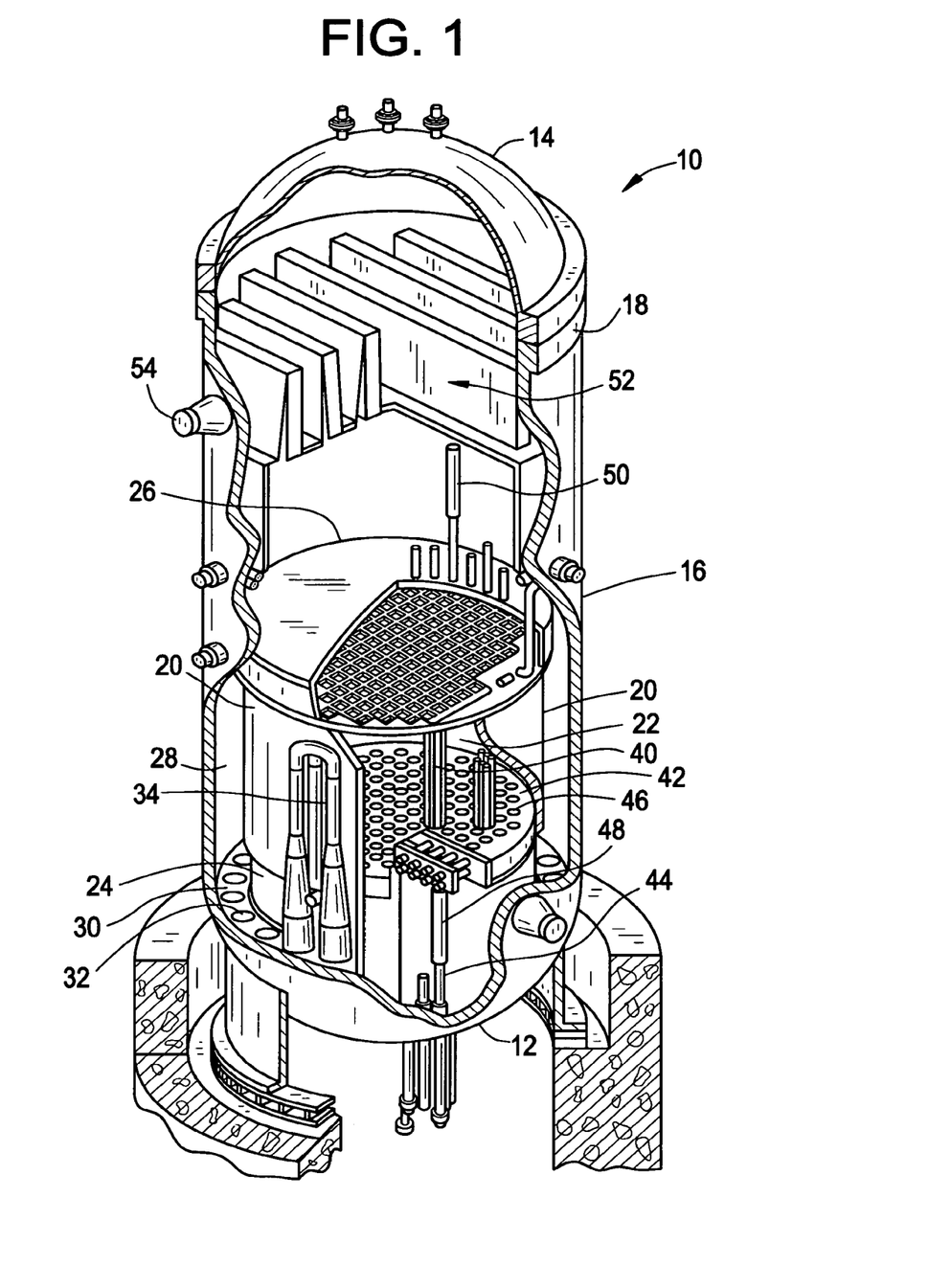
FIG. 1 is sectional perspective view, with parts cut away, of a boiling water nuclear reactor pressure vessel as one exemplary operating environment for fuel rods, fuel assemblies and core designs according to the present disclosure.

Referring now to FIG. 1, an exemplary embodiment of an operating environment for fuel rods and fuel assemblies of the present disclosure is illustrated in the sectional view, with parts cut away, of a boiling water nuclear reactor pressure vessel (RPV) 10. The reactor pressure vessel 10 has a generally cylindrical shape and is closed at one end by a bottom head 12 and at its other end by a removable top head 14. A side wall 16 extends from bottom head 12 to top head 14. The side wall 16 includes a top flange 18 on which the top head 14 is attached. A cylindrically shaped core shroud 20 surrounds a reactor core 22. The shroud 20 is supported at one end by a shroud support 24 and includes an opposed removable shroud head 26. An annulus 28 is formed between the shroud 20 and the side wall 16.

In some embodiments, a pump deck 30, which has a ring shape, extends between the shroud support 24 and the side wall 16. The pump deck 30 includes a plurality of circular openings 32, with each opening housing a jet pump 34. The jet pumps 34 are circumferentially distributed around the core shroud 20. In other embodiment, pumps 34 are not required as the water flow is created non-mechanical methods as are known in the art.

Heat is generated within the core 22, which includes fuel cells 40. Each fuel cell 40 includes one or more fuel bundles 42, and in one embodiment contains four fuel bundles 42, by way of example. Each fuel bundle 42 includes a plurality of fuel rods (not shown) of fissionable material and a control rod 44 associated with it. The fuel rods are arranged in a matrix such as a 10×10 matrix.

The fuel bundles 42 are typically mounted on top of a core plate 46 in a boiling water reactor from which the fuel bundles 42 receive water and from which the control rods 44 are inserted and withdrawn from the core 22 and between one or more of the fuel bundles 42. The amount of heat generated in the core 22 is regulated by inserting and withdrawing a plurality of control rods 44 of neutron absorbing material, for example, hafnium. To the extent that a control rod 44 is inserted next to a fuel bundle 42, it absorbs neutrons that would otherwise be available to promote the chain reaction which generates heat in core 22. Control rod guide tubes 48 are located beneath the core plate 46 and receive the control rods 44 when withdrawn from the core 22. The control rod guide tubes 48 restrict non-vertical motion of the control rods 44 during insertion and withdrawal.

Water is circulated up from beneath the core plate 46 through the fuel bundles 42 and is at least partially converted to steam by heat generated by the nuclear reaction within the fuel rods of the fuel bundles 42. Steam separators 50 separate the steam from the water, and the water is recirculated. Steam dryers 52 remove residual water from the steam. The steam exits reactor pressure vessel 10 through a steam outlet 54 near vessel top head 14.

Figure 2:
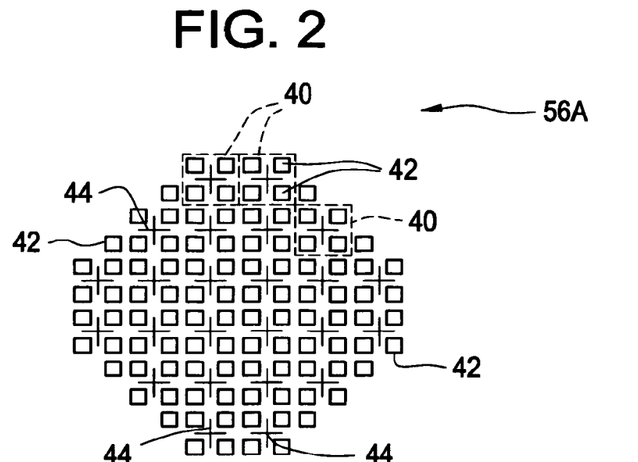
FIG. 2 is an exemplary schematic plan view illustrating a general layout of a reactor core.

Referring now to FIG. 2, a simplified core 56A is illustrated having a plurality of fuel cells 40, bundles 42 and control rods 44 arranged as a matrix within the core 22. It should be understood that the core 56 is simplified as a typical core 22 can contain more than 700 fuel bundles 42, more than 95,000 fuel rods, and more than 190 control rods.

Figure 3:
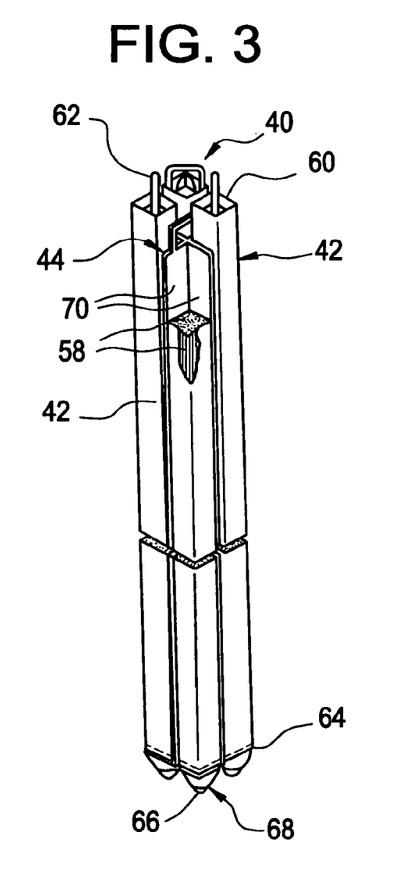
FIG. 3 is a simplified exemplary, partly cut away, isometric view of one of the fuel cells having four fuel bundles and a control rod from a core of a nuclear reactor.
Figure 4:
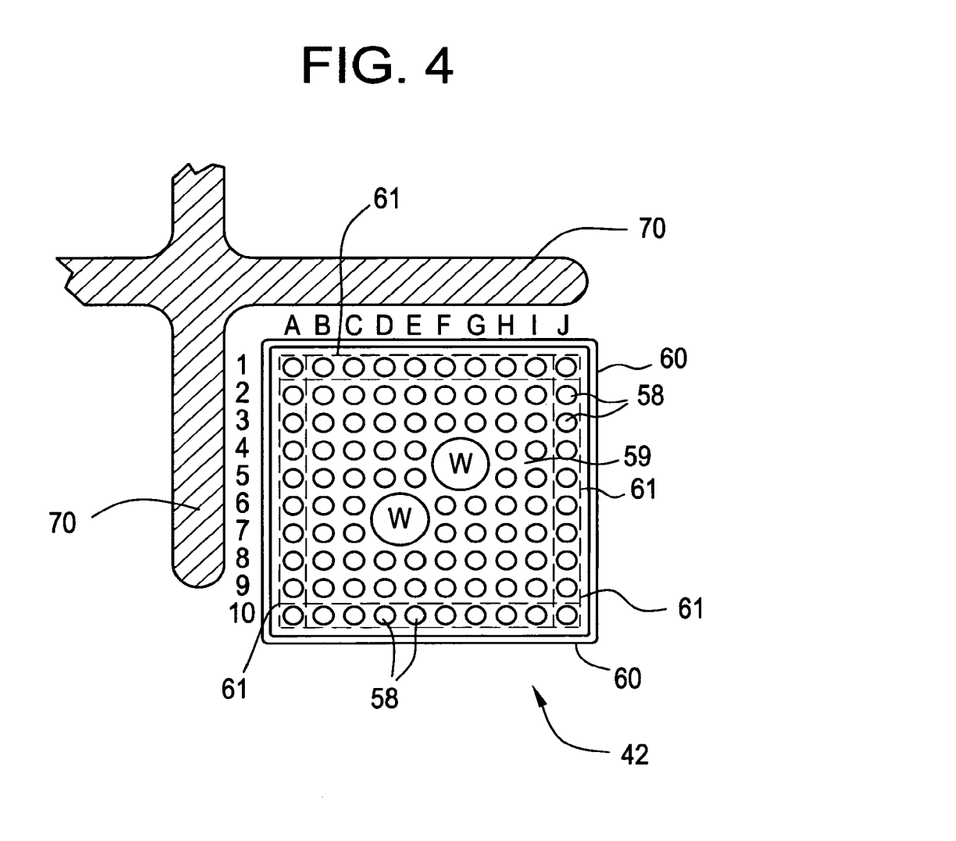
FIG. 4 is a simplified schematic plan view illustrating a general layout of a fuel bundle having a 10×10 matrix including a plurality of fuel rods.

In FIG. 3, a fuel cell 40 is illustrated in a partly cut away isometric view and having four fuel bundles 42 and a control rod 44. Each fuel bundle 42 includes a plurality of fuel rods 58 enclosed within a fuel bundle casing 60. One simplified illustration of a fuel bundle 42 is illustrated in FIG. 4 having a 10×10 matrix or lattice of fuel rods 58 within fuel casing 60. The fuel rods 58 within the fuel bundle 42 can be defined by their matrix or lattice position within the fuel bundle (such as by the lettered columns and numbered rows), by their relative position (such as indicated by those in the matrix having a radial position 61 about the perimeter of the fuel rod matrix), and/or by their configuration. The fuel bundle 42 can also include one or more water channels 59.

Referring again to FIG. 3, the fuel bundle 42 includes a handle 62 located on the top of the fuel bundle 42 to aid in fuel bundle 42 insertion and removal from the core 22. Each fuel bundle 42 includes a lower tie plate 64 on which the fuel rods 58 are mounted, and a nose 66 having openings 68 through which coolant is received to flow upward within the fuel bundle casing 60 and around the fuel rods 58 as described above. The control rod 44 includes a plurality of control blades 70 each of which is configured to interpose between four adjacent fuel bundles 42 for controlling nuclear reaction therebetween.

As shown in FIG. 3, each fuel rod 58 within a fuel bundle 42 has a length that typically is in the range of about 150 inches, and can include lengths about equal to 120 inches, 133 inches, 138 inches, 139 inches, and 145 inches, by way of examples. As such, each fuel rod has a bottom end mounted on the lower tie plate 64, a top end positioned on the other end of the fuel rod, and an intermediate portion positioned therebetween. The length from the bottom end to the top end defines the axial dimension of the fuel rod 58 that is typically referred to as the axial position relative to the bottom end.

Each fuel rod 58 within the fuel bundle 42 can have a different enrichment or gadolinium doping distributed along the axial dimension of the fuel assembly as defined by the stacked sintered fuel pellets arranged within an elongated fuel bundle channel 60 from the bottom end to the top end. Various contents of fuel pellets with various levels of enrichment or other material within the fuel rod 58 are generally referred herein as an axial zone.

Figure 5:
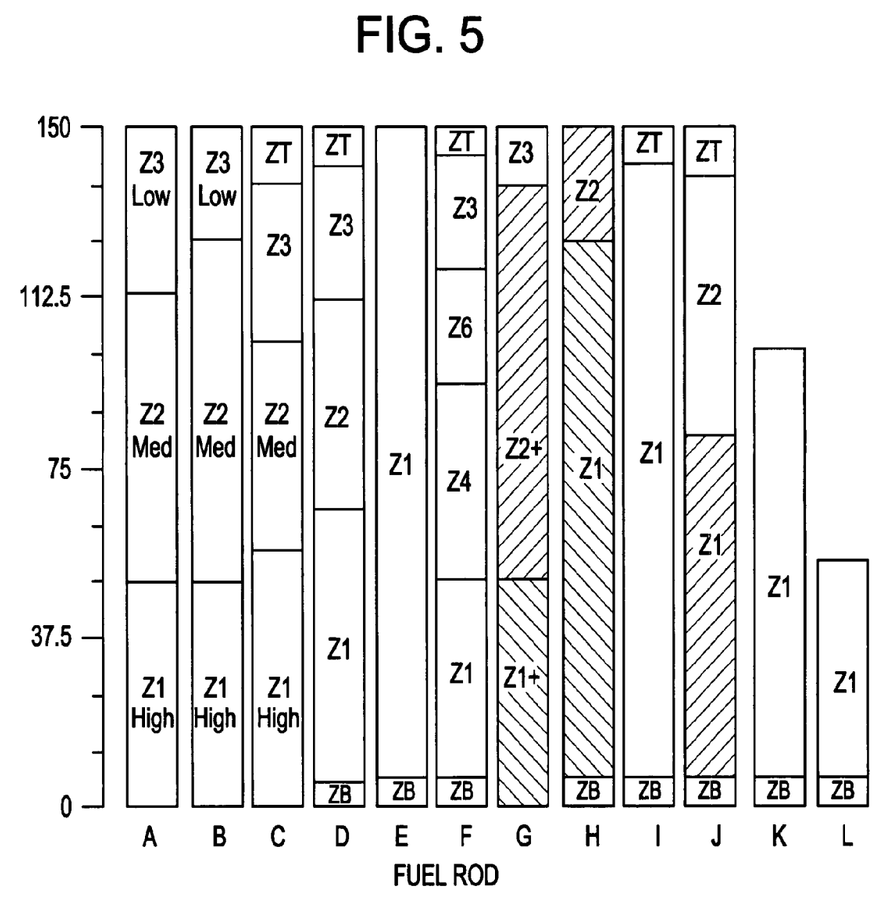
FIG. 5 is a chart illustrating a variety of axial zone configurations according to various exemplary embodiments of the disclosure.

In one exemplary embodiment, a fuel rod for a nuclear reactor includes a first axial zone positioned proximate to a bottom end, a second axial zone positioned adjacent to the first axial zone in an intermediate region, and a third axial zone positioned proximate to a top end. The first axial zone has an enrichment greater than the second axial zone and the second axial zone has an enrichment greater than or equal to the third axial zone. Such fuel rods can be limited to having only three axial zones in some embodiments (such as illustrated in FIG. 5) and in other embodiments may have four, five, or more axial zones (also shown in FIG. 5, by way of examples), with a combination of enrichments, burnable absorbent or other dopings, and/or natural uranium. As shown in FIG. 5, each of twelve fuel rods has a different height of first axial zone Z1, second axial zone Z2, third axial zone Z4, etc. Fuel rods A-F, I, K and L have enrichments (not shown) while fuel rods G, H, and J are denoted as including a burnable absorbent as indicated by the cross-latching. As noted in the various fuel rod designs of FIG. 5, the total number of axial zones of each fuel rod is limited, but the number of axial zones in each rod and the height of each axial zone can vary. Additionally, while not explicitly shown in FIG. 5, the enrichment in each zone can also vary, consistent with the first axial zone having the highest enrichment of the axial zones within each fuel rod.

In a first exemplary embodiment, a first axial zone has a greater enrichment than the second axial zone. One of the advantages of the embodiment is that the axial shape is maintained at the bottom of the core to provide improved fuel efficiency and better pressurization transients. In a second exemplary embodiment, the second axial zone has a greater enrichment than the third axial zone. One advantage of this embodiment is that less leakage occurs at the top of the core for providing improved fuel efficiency.

In a third exemplary embodiment, the first axial zone has an enrichment greater than the second and third axial zones. In this design, the fuel assembly provides for improved local peaking factors and R-factors, and therefore, improved fuel cycle efficiency. In other embodiments, the second and third axial zones have substantially equivalent enrichments. By these three examples, it can be seen that by utilizing one or more embodiments of the integrated axially varying enrichment profiles as described in the present disclosure, various design objectives and fuel cycle efficiencies are achievable through cost effective fuel bundles having various profiles. These can be achieved by varying the number of axial zones within a limited number of variations, varying the enrichments of the axial zones with the lower first axial zone having a greater enrichment than higher axial zones and varying the zone lengths in various rods within fuel bundles.

As described above, the zone height relative to the bottom end or zero height indication can be varied in addition to the number of zones. It should be understood that the description and recitation of three, four or five axial zones is not intended to limit the existence of one or more additional axial zones within a fuel rod or the location within a fuel rod unless specifically noted within one or more of the described exemplary embodiments. However, as will be noted in further detail below, in some embodiments, a substantial portion or all fuel rods within a fuel bundle have the same number of axial zones, with each axial zone in each rod being filled with pellets having the same enrichment. In such cases, complex fuel bundles are configured only by changes in the zone heights between fuel rods and the position of the various fuel rods within the fuel bundle. In other embodiments, the number of zones per rod and the enrichment and/or burnable absorbent in one or more zones can also be varied to produce complex fuel bundles.

For example, in some embodiments a bottom end axial zone is positioned at the bottom of the fuel rod between the bottom end and the first axial zone. This bottom end axial zone can include natural uranium (not enriched) or can include an enrichment equal to, or less than the first axial zone. Also, in some embodiments a top end axial zone is positioned at the top of the fuel rod. This top end axial zone can include natural uranium (not enriched) or can include an enrichment equal to, or less than the first axial zone. As noted above one or more additional axial zones of enrichment, burnable absorber dopings, or natural uranium can be included in one or more positions or locations on the fuel rod. However, in one embodiment a fuel rod has no more than three enrichment zones and in another embodiment a fuel rod has no more than five enrichment zones, with two of the five being the bottom end axial zone and the top end axial zone.

Similarly, the enrichment of the axial zones and the length of each zone can also be customized for desired nuclear reactor core designs and operations. For example, in one embodiment the enrichment and/or length of the first axial zone can be configured to optimize a local peak power (typically in Kw/ft) of the fuel rod or a peak power or peaking factor of a fuel bundle in which the fuel rod is assembled. The zone length for the first axial zone can be a minor or substantial portion of the total length of the fuel rod and in one embodiment is about one third of the total length of the fuel rod. In another exemplary embodiment, the enrichment and/or a length (sometime referred herein to as the height) of one or both of the second and third axial enrichment zones are dimensioned to optimize an R-factor (e.g., critical power ratio or CPR), a power distribution profile, and/or a local peak power of the fuel rod or the fuel bundle in which the fuel rod is assembled. The enrichments in each of the first, second, and/or third axial zones can be uniformly distributed axially within each zone, or can be tapered or otherwise shaped for fuel rod and fuel bundle design requirements and performance objectives.

In another embodiment, a method of designing a fuel rod for a nuclear reactor includes specifying an enrichment for a first axial zone positioned proximate to a bottom end of a fuel rod to minimize a local peak power, determining an enrichment for a second axial zone positioned adjacent to the first axial zone in an intermediate region of the fuel rod, and determining an enrichment for a third axial zone positioned proximate to a top end of the fuel rod, wherein determining the enrichments for the second and third axial zones are to minimize an R-factor.

This can include specifying the enrichment for the first axial zone to specify first enrichment that is greater than the enrichment for the second axial zone and/or the third axial zone. Additionally, this can include determining the enrichment of the third axial zone that is less than or equal to the enrichment of the second axial zone. Also in some embodiments, the zone length for the first axial zone is determined to optimize the local peak power, and one or both of the zone length for the second axial zone and the zone length for the third axial zone are each determined to optimize the R-factor as described above.

As noted above, one or more embodiments of the fuel rods as described herein can be assembled into a fuel bundle (also referred herein as a fuel assembly) and one or more fuel bundles can be arranged to form a core in a nuclear reactor. Each fuel bundle includes a plurality of fuel rods with one or more of the fuel rods having a first axial zone positioned generally at a bottom end, a second axial zone positioned adjacent to the first axial zone in an intermediate region, and a third axial zone positioned generally at a top end. As noted above, the first axial zone has an enrichment greater than the second axial zone and the second axial zone has an enrichment greater than or equal to the third axial zone.

Also as noted above, one or more of the fuel rods within the fuel assembly can have various enrichments that can be determined and/or customized for various optimizations. For example, one or more axial zones of one or more rods within the fuel bundle can include an enrichment or include zone lengths that provides for an optimized R-factor and/or local peak power of the rod, the fuel bundle and/or the core. Additionally, as noted above the lengths of the axial zones in one or more fuel rods within the fuel bundle can be varied to provide for improved and/or controlled operational characteristics. By way of example, the zone length of the first axial zone can be equal to about one-third of the total length of the fuel rod in one or more of the fuel rods of the fuel assembly. In other fuel rods in the fuel bundle, the length of the first axial zone can be more or less than the one-third length.

For example, in some embodiments, a fuel assembly for a nuclear reactor includes a plurality of fuel rods wherein one or more fuel rods includes a first axial zone positioned generally at a bottom end, a second axial zone positioned adjacent to the first axial zone in an intermediate region, and a third axial zone positioned generally at a top end, wherein the first axial zone is configured to optimize a local peak power of the first axial zone and the second and third axial zones are configured to optimize an R-factor for the fuel assembly.

Similarly, in some embodiments a method of designing a fuel assembly for a nuclear reactor includes specifying enrichments for a first axial zone of each of a plurality of fuel rods within the fuel assembly to optimize local peak power of the first axial zone, the first axial zone being positioned proximate to a bottom end of each fuel rod, and determining enrichments for a second axial zone and a third axial zone of each of a plurality of fuel rods within the fuel assembly to optimize an R-factor for the fuel assembly, the second axial zone being positioned adjacent to the first axial zone in an intermediate region of each fuel rod, and the third axial zones being positioned proximate to a top end of each fuel rod.

As discussed above with regard to a single fuel rod, the enrichments and zone lengths for a plurality of the fuel rods within the fuel assembly can be specified and determined to meet objectives for the fuel assembly. This can include determining an enrichment for each second axial zone and each third axial zone of each fuel rod with the fuel assembly such that both have a lower enrichment for the first axial zone within each corresponding fuel rod and in some cases across all of the fuel rods within the assembly. In other embodiments, the enrichment for each third axial zone of each fuel rod can be determined such that the enrichment of one or both are less than the first fuel rod and such that in some embodiment, the enrichment of the third axial zone is less than or equal to the enrichment for the second axial zone in each corresponding fuel rod and in some cases across all of the fuel rods within the fuel assembly.

This can also include determining a zone length for each of the first axial zones of each fuel rod to optimize the local peak power of the first axial zone and determining a zone length for each of the second axial zones and each of the third axial zones of each fuel rod to optimize the R-factor for the fuel assembly.

In one embodiment, the enrichments for each second axial zone and each third axial zone are determined after the enrichments for each first axial zone for all of the fuel rods within the fuel assembly. For example, the first axial zone within the fuel assembly can be designed for minimizing the local peak power and then the second and third axial zones of the fuel rods and the fuel assembly are designed to minimize the R-factor for the entire fuel assembly, taking into account the previously minimized local peak power in the first or lower portion of the fuel assembly.

This can also include increasing the enrichment of the second axial zones and the third axial zones in some of the fuel rods, such as the fuel rods positioned about the perimeter or edge of the fuel assembly. And in some embodiments, this can include reducing the enrichments for the second and third axial zones of fuel rods positioned within a center portion (other than the edge) of the fuel assembly.

As known to those skilled in the art from this discussion, not all fuel rods within a fuel bundle or fuel bundles within a core are required to have the same configuration, such having the same enrichments for each zone, or same length of each zone, or same number of zones per fuel rod. For example, in one fuel bundle all or a substantial portion of the fuel bundles can be limited to the same number of axial zones (such as three, four, or five) which provides manufacturing advantages. However, the enrichment, burnable absorber doping, and/or length of each axial zone between one or more of the fuel rods can be different. In this manner, manufacturing costs can be reduced and reactor core designer's have the ability to design a core to a preferred design or to desired operational characteristics by per fuel rod, per fuel bundle, and core design adjustments.

In one exemplary operation, each of a plurality of fuel bundles is configured to have different local peaks and different R-factors. In two or more of the fuel bundles, a substantial portion of the fuel rods have essentially three axial enrichment zones (first second and third axial zones). This may include a nominal bottom end zone at the bottom and a nominal top end zone at the top. A substantial portion of the first zones in each fuel rod has first fuel pellets of essentially equal enrichment, a substantial portion of the second zones in each fuel rod has fuel pellets of essentially equal enrichment, and a substantial portion of the third zones in each fuel rod has fuel pellets of essentially equal enrichment. The enrichment of each first fuel pellets is greater than the second fuel pellets and the third fuel pellets. A plurality of the fuel rods in the fuel bundle can have different zone lengths or heights for the first, second and third zones. By only changing the zone lengths in the plurality of fuel rods with each fuel bundle and the location of each of such axially varying enrichments, two or more of the fuel bundles have different local peak powers and different R-factors. As such, a designer of the fuel matrix can create a desired or optimized core from a variety of complex axially varying enrichment bundles through using axially varying enrichment fuel rods that are otherwise similarly composed and manufactured.

Additionally, the fuel rods within the fuel assembly can be optimized based on their position within the fuel assembly. For example, edge rods are typically the rods positioned along or about a perimeter of the matrix of fuel rods within a fuel assembly. In some embodiments, only the first axial zones of the radial fuel rods are optimized for local peak power. The first axial zones of the other fuel rods are separately enriched and/or configured, but not for optimizing local peak power. Similarly, in some embodiments, only the second axial zones and/or third axial zones of the radial rods are optimized for R-factor or critical power ratio (CPR). The second and third axial zones in the other rods within the fuel assembly have different levels of enrichment and different zone lengths, but are not optimized for their R-factor.

In another exemplary embodiment, one or more fuel rods of a fuel assembly can include two or more groups of fuel rods each having a different combination of axial zones, enrichments, optimized factors such a local peak power and R-factor, by way of example, and/or axial zone lengths for customizing the design and characteristics of the fuel assembly. Each group can be composed of a subset of the fuel rods and possibly one or more having a substantial portion of the total number of fuel rods within the fuel bundle.

Figure 6:
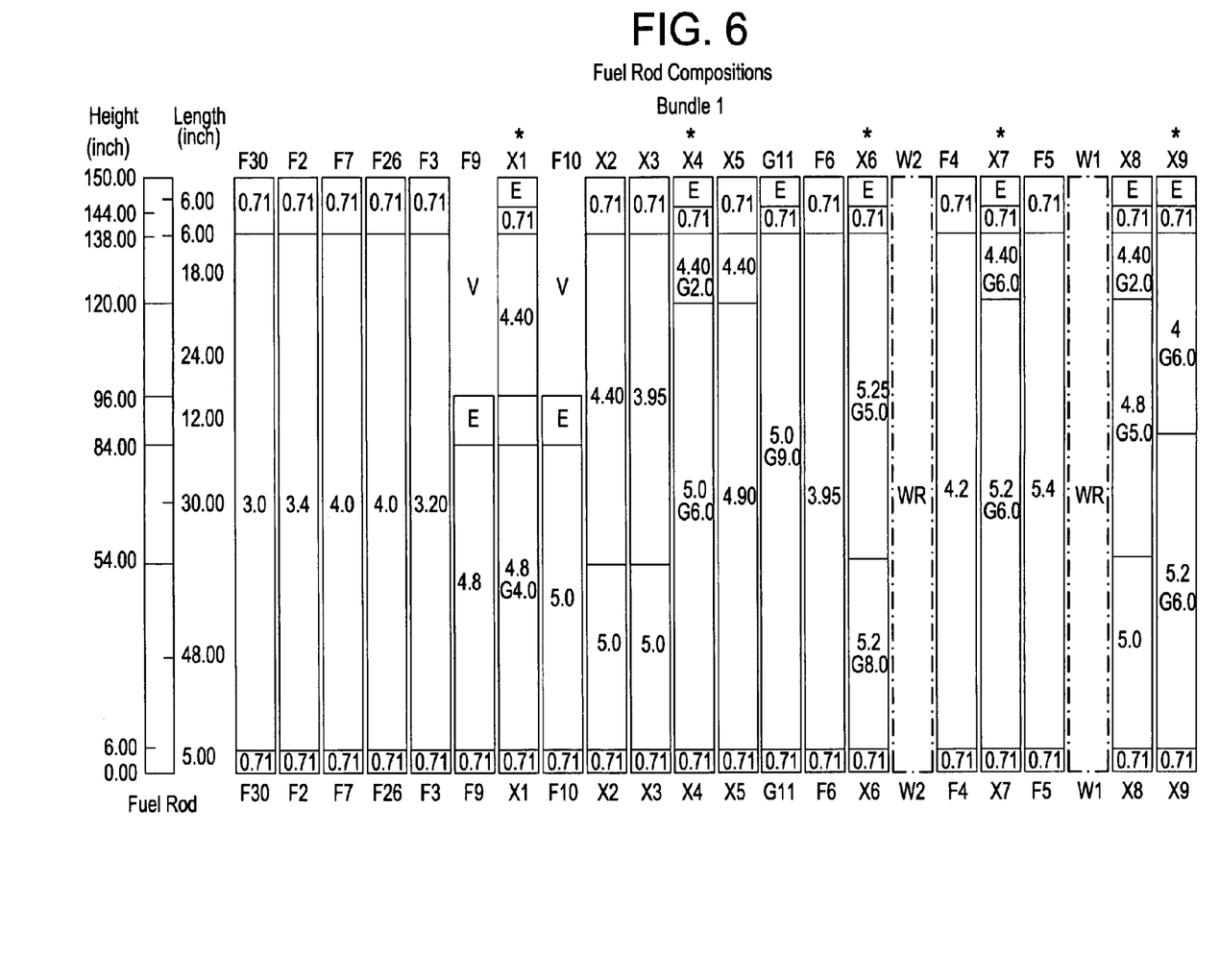
FIG. 6 is a chart illustrating a plurality of integrated axial zoned enrichment fuel rods for a first exemplary fuel bundle.

Referring now to FIG. 6, in one exemplary embodiment a first bundle (denoted as bundle 1) includes 22 fuel bundle elements, two being water channels W1 and W2 and 20 different types of fuel rods. Each of the 20 different fuel rods in this example includes a bottom axial zone of naturally enriched uranium of 0.71. Additionally, many of the fuel rods include a top axial zone also including naturally enriched uranium of 0.71. In some of the fuel rods, a top zone includes natural uranium as indicated by the designation "0.71." Each axial zone includes the amount of uranium enrichment as indicated by the number within the zone. In some fuel rods, an amount of gadolinium doping is also indicated by a "G" such as G4.0.

As shown, most fuel rods are full length rods of 150 inches. However, two of the fuel rods are partial length rods F9 and F10, each of which includes only a first axial zone with a high enrichment of 4.8 and 5.0, respectively. Note that the top portion of these partial length rods are denoted with a "V" and referred to by those skilled in the art as vanished rods.

Figure 7:
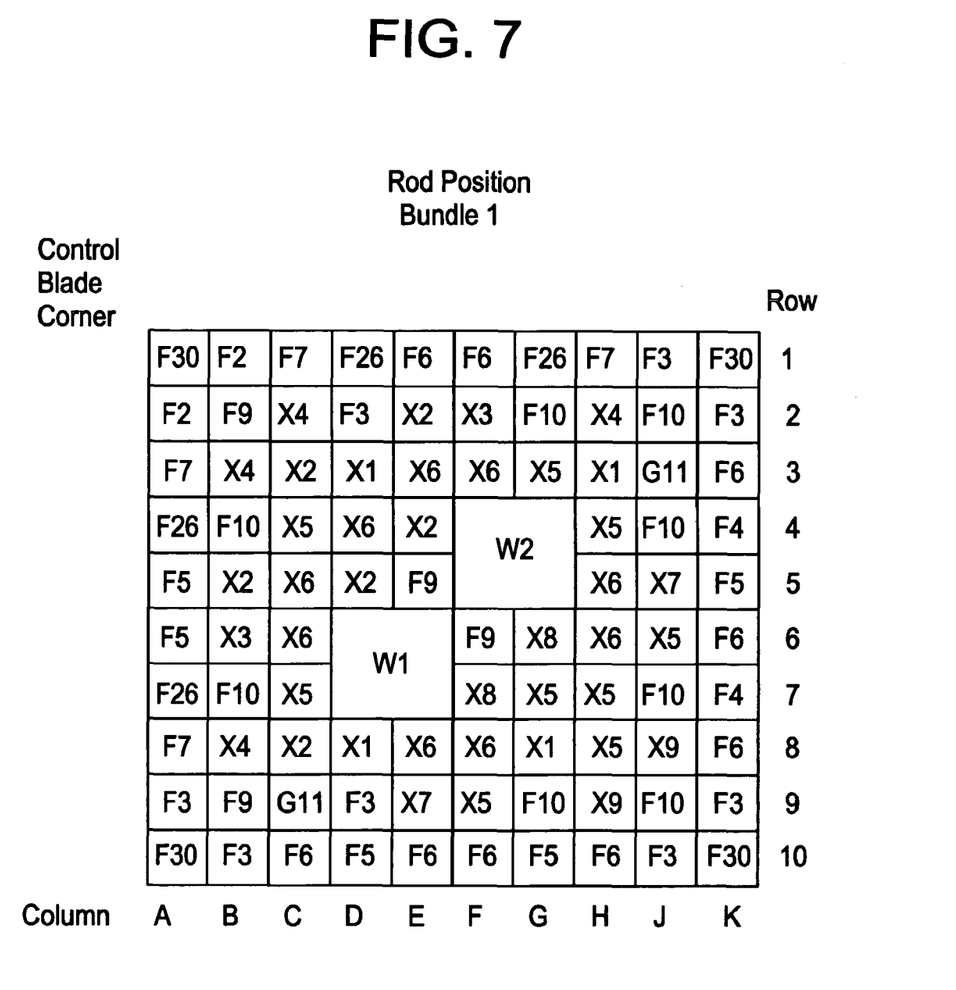
FIG. 7 is a schematic plan view of the first exemplary fuel bundle illustrating the layout of the plurality of integrated axial zoned enrichment fuel rods according to one exemplary embodiment.

These 20 types of fuel rods are utilized to form the fuel bundle as shown in FIG. 7. Each fuel rod and its position within the fuel bundle are designed and assembled to achieve the design objectives of the core. Other fuel bundle designs and design objectives can be obtained by using the same 20 fuel rods as illustrated in FIG. 6. However, in some embodiments variations to one or more of the fuel rods and additional fuel rod design may be desired or required for other fuel bundles within a core design in order to achieve the desired objectives. As shown in FIG. 6, a select number of fuel rods (those indicated at the top with the asterisk) can be modified through changes in the number of axial zones, the enrichment or doping of the axial zones, and/or the zone lengths to achieve different bundle designs.

Figure 8:
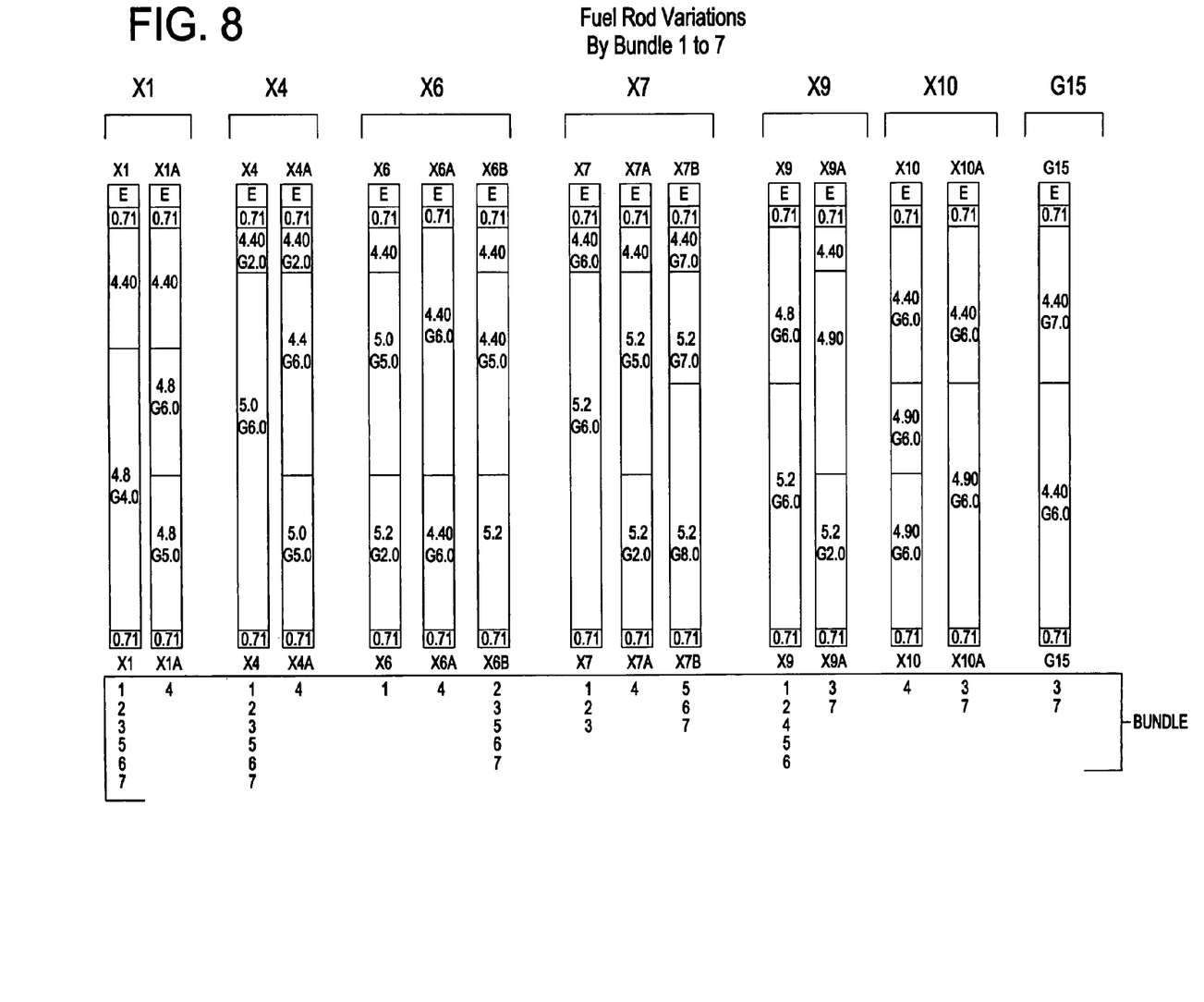
FIG. 8 is a chart illustrating variations in the axial zone design and enrichments from the first exemplary fuel bundle shown in FIG. 6 for use in the second through seventh fuel rods according to one exemplary embodiment.
Figure 9:
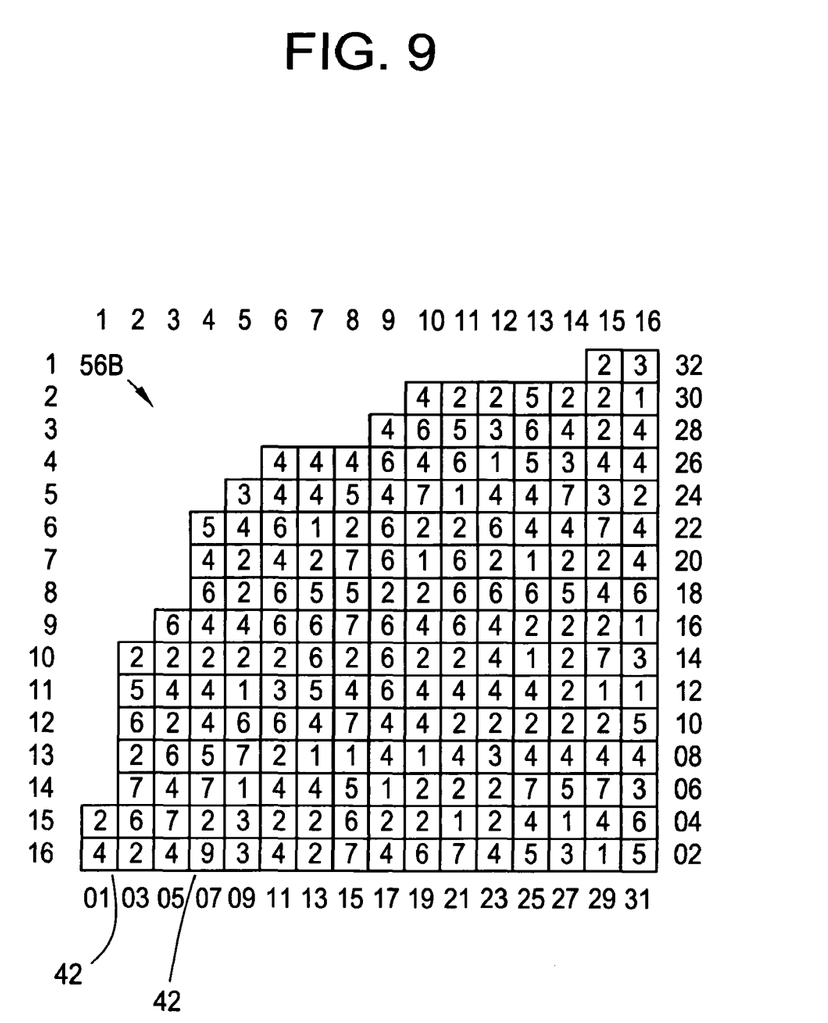
FIG. 9 is an exemplary schematic plan view of a quarter of a reactor core utilizing the seven fuel bundle designs as provided in FIGS. 6-8 according to one exemplary embodiment.

FIG. 8 illustrates one set of example fuel rod axial zone variations for seven different fuel bundles (one through seven) for use in an exemplary core 56B as illustrated in quarter core format in FIG. 9. The entire core of FIG. 9 is composed of these seven fuel bundles, each of which is composed of the fuel rods of FIGS. 6 and/or variations as shown in FIG. 8. FIG. 8 illustrates variation in or modifications to the make up and length of the axial zones of fuel rods, X1, X4, X6, X7 and X9, with each variation being indicated by the primes and double primes at the top of each modified fuel rod. The bundles within the core containing each fuel rod makeup are indicated at the bottom of each fuel rod.

In FIG. 8, the fuel rod X1 is shown having a first axial zone with an enrichment of 4.8 and a gadolinium doping of 4.0. The second axial zone has a lower enrichment of 4.4 without gadolinium doping. The X1 fuel rod is utilized in fuel bundles 1-3, and 5-7. However, in fuel bundle 4, a modified X1A fuel rod includes a segmentation of the first axial zone to include a higher gadolinium doped portion or zone in the middle of the fuel rod. A similar modification to the fuel rod X4 is shown as fuel rod X4A, but where the gadolinium doping is held constant but the uranium enrichment is reduced from a first axial zone to a second axial zone located in the middle of the fuel rod of bundle 4.

As indicated in FIG. 8, the fuel rod X6 (from FIG. 6) is only in fuel bundle 1. The modified fuel rod X6A is used in fuel bundle 4 and the modified fuel rod X6B is in fuel bundles 2, 3, and 5-7. In fuel rod X6A, one of the enrichment zones is eliminated and in fuel rod X6B gadolinium doping is removed from the first axial zone and the enrichment of the second axial zone is reduced. The fuel rod X7 is in fuel bundles 1-3, but is modified as X7A for use in fuel bundle 4 and as X7B for use in fuel bundles 5-7 as shown. The fuel rod X9 is in fuel bundles 1, 2, and 4-6, but is modified for use in fuel bundles 3 and 7 by adding in fuel rod X9A a third axial zone and adjusting the lengths of the first and second axial zones.

As noted above, some fuel rods may only be configured for use in a subset of the core such as in FIG. 9. As illustrated in FIG. 8, fuel rod X10 is only in fuel bundle 4, and fuel rods X10A and G15 are only in fuel bundles 3 and 7. Each of these includes variations of enrichment, number of axial zones, and gadolinium doping levels according to various embodiments of this disclosure.

Figure 10:
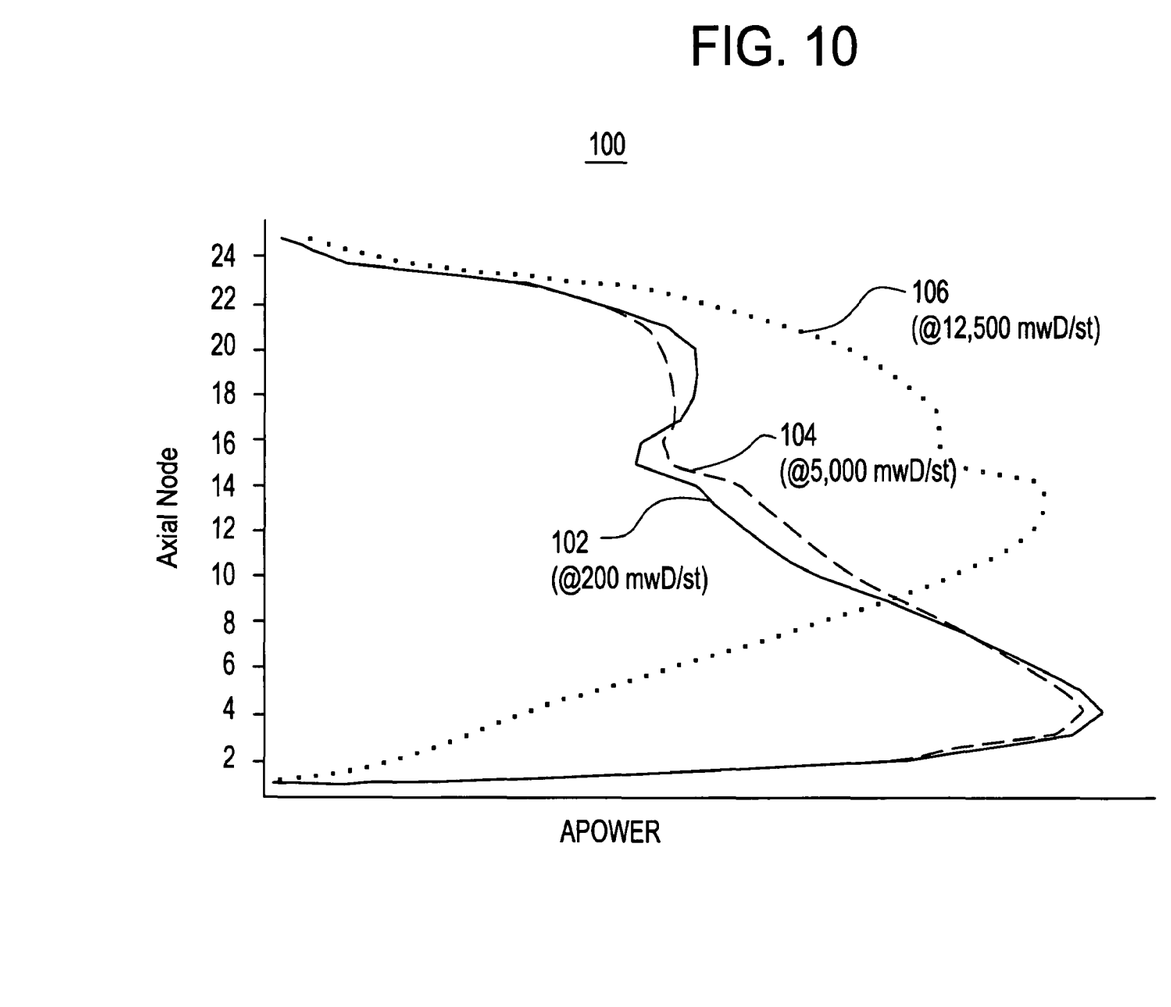
FIG. 10 is a chart of axial power axial nodal versus exposure at three example reactor exposure intervals for a reactor core configured using integrated axially varied enrichment fuel bundles according to one exemplary embodiment.

The core 56B design as shown in FIG. 9 that is configured from the various fuel rods and fuel bundles as described in FIGS. 6-8 can provide for improved axial power axial nodal performance. For example, as illustrated in the chart 100 of axial power axial nodal to exposure in FIG. 10, line 102 illustrates the axial power at 200 megawatt days per standard ton of uranium (MWD/ST) and line 104 illustrates the axial power at 5,000 MWD/ST. Both of these reflect a peak around axial node 4, or very low within the core. As noted above, improved fuel cycle efficiency results from such an axial power axial nodal distribution low in the core. Additionally, with additional exposure as illustrated by line 106, at 12,500 MWD/ST) the peak of the axial power rises from axial node 4 to about axial node 14, or around the axial middle of the core. This is still considered to be relatively low in the core especially at 12,500 MWD/ST. As known to those skilled in the art, such a lowered axial power peaking over such exposures have not been herebefore attainable and provide a number of signification advantages as noted elsewhere and known to those skilled in the art.

The various fuel rods as described by the exemplary embodiments can be manufactured by a variety of methods. For example, in one exemplary method of manufacturing a fuel rod such as a tube having a bottom end, a top end, and an intermediate region located between the bottom end and the top end is filled with a plurality of first fuel pellets having a first enrichment to a first axial zone length to form a first axial zone positioned generally in the bottom end of the tube. The first zone can have any length and in one embodiment is about equal to a third of the total length of the tube. The tube can also be filled with a plurality of second fuel pellets having a second enrichment to a second axial zone length to form a second axial zone with the second enrichment being less than the first enrichment. The method also includes filling the tube with a plurality of third fuel pellets having a third enrichment to a third axial zone length to form a third axial zone with the third enrichment being less than or equal to the second enrichment.

In some embodiments, the method includes filling the tube with bottom end fuel pellets before filling the tube with first fuel pellets to form a bottom end axial zone positioned adjacent to the bottom end of the tube and between the bottom end and the first axial zone and having a bottom end zone length. Additionally, in some embodiments the tube can be filled with top end fuel pellets after filling the tube with third fuel pellets to form a top end axial zone positioned proximate or adjacent to the top end of the tube and having a top end zone length.

One or more of the fuel bundles described herein can be manufactured by a variety of methods and still be in the scope of the disclosure. For example, in one exemplary method of manufacturing, a fuel bundle for a nuclear reactor is assembled by filling a first tube with a plurality of fuel pellets having a first enrichment to a lower zone length to form a lower axial zone positioned generally in a lower portion of the tube, filling the first tube with a plurality of fuel pellets having a second enrichment to an intermediate axial zone length to form an intermediate axial zone, the second enrichment being less than the first enrichment, and filling the first tube with a plurality of fuel pellets having a third enrichment to a upper axial zone length to form an upper axial zone, the third enrichment being less than or equal to the second enrichment; and filling a second tube with a plurality of the fuel pellets having the first enrichment to a second lower axial zone length to form a second lower axial zone positioned generally in a lower portion of the second tube, a plurality of fuel pellets having the second enrichment to a second intermediate axial zone length to form a second intermediate axial zone, and a plurality of fuel pellets having a third enrichment to a second upper axial zone length to form a second upper axial zone. The second intermediate axial zone length is greater than the first intermediate axial zone length.

As noted above, the lower axial zone lengths of the first and second tubes can be dimensioned as a function of optimizing a peak power of the fuel bundle and the axial zone lengths of the intermediate and upper axial zones for the first and second tubes are each dimensioned as a function of optimizing an R-factor of the fuel bundle. In some embodiments, a variety of different zone axial zone lengths for axial zone 1, zone 2 and/or zone 3 can be varied during fuel rod and fuel bundle assembly for a variety of portions of the fuel rods within a fuel assembly. This method of manufacturing can provide for reduced manufacturing costs for fuel rods and fuel assemblies while also providing a core for nuclear reactors having improved fuel cycle efficiency. For example, in one embodiment the inventors were successful at designing fuel bundles having bundle enrichments 0.10 below reference bundle average enrichments. This corresponds to a significant reduction in the cost of uranium per bundle and a large corresponding fuel cycle efficiency improvement. Similar or better efficiency improvements are expected from other embodiments as described herein.

Where one or more fuel rods includes the bottom end or bottom axial zone, the method of manufacturing can also include filling the first tube and the second tube with a plurality of bottom fuel pellets to a bottom axial zone length or height before filling the lower axial zones. The bottom fuel pellets can include natural uranium and or enriched bottom fuel pellets having an enrichment about equal to the first enrichment, by way of example. The method can also include filling the first and second tubes with a plurality of top fuel pellets after filling the upper axial zones. In such embodiments, filling with top fuel pellets is to a top end axial zone length or height to form a top axial zone positioned proximate to the top of the tube.

The first lower axial zone can have a length about equal to a length of the second lower axial zone, the first intermediate axial zone has a length greater than a length of the second intermediate axial zone, and the first upper axial zone has a length less than the length of the second upper axial zone.

In some embodiments, the method further includes filling a third tube with a plurality of the fuel pellets having a bottom end enrichment to a third lower axial zone length to form a third lower axial zone positioned generally in a lower portion of the third tube, a plurality of fuel pellets having a top end enrichment to a third intermediate axial zone length to form a third intermediate axial zone, and a plurality of fuel pellets having a sixth enrichment to a third upper axial zone length to form a third upper axial zone. Various enrichment combinations can include the first enrichment being greater than the bottom end enrichment, the second enrichment being greater than the top end enrichment; and/or the third enrichment being greater than the sixth enrichment, by way of examples.

When describing elements or features and/or embodiments thereof, the articles "a", "an", "the", and "said" are intended to mean that there are one or more of the elements or features.

The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A fuel rod for a nuclear reactor having a bottom end, a top end, and an intermediate region located between the bottom end and the top end, comprising:
   a first axial zone positioned proximate to the bottom end;
   a second axial zone positioned adjacent to the first axial zone in the intermediate region; and
   a third axial zone positioned proximate to the top end,
   wherein the first axial zone has an enrichment greater than the second axial zone and the second axial zone has an enrichment greater than or equal to the third axial zone, the first axial zone, the second axial zone, and the third axial zone having different levels of at least one of average enrichment and average gadolinium doping,
   wherein enrichments for each of the first, second, and third axial zones is uniformly distributed axially within each axial zone.

2. The fuel rod of claim 1 wherein the enrichment of the first axial zone is configured to optimize a local peak power.

3. The fuel rod of claim 2 wherein a zone length of the second axial zone and a zone length of the third axial zone are each dimensioned to optimize an R-factor.

4. The fuel rod of claim 2 wherein the enrichment of the second axial zone and the enrichment of the third axial zones are each selected to optimize for an R-factor.

5. The fuel rod of claim 1, further comprising a bottom end axial zone positioned between the bottom end and the first axial zone, wherein the bottom end axial zone includes at least one of natural uranium and an enrichment about equal to the enrichment of the first axial zone.

6. The fuel rod of claim 5, further comprising a top end axial zone positioned between the third axial zone and the top end, wherein the top end zone includes at least one of natural uranium and an enrichment about equal to the enrichment of the first axial zone.

7. The fuel rod of claim 6 wherein the fuel rod has no more than 5 axial zones.

8. The fuel rod of claim 1 wherein a zone length of the second axial zone and a zone length of the third axial zone are dimensioned for optimizing an R-factor.

9. The fuel rod of claim 1 wherein the fuel rod has no more than 3 axial zones having enrichments so as to be distinct from natural uranium.

10. A fuel assembly for a nuclear reactor comprising a plurality of fuel rods wherein one or more fuel rods include a first axial zone positioned generally at a bottom end, a second axial zone positioned adjacent to the first axial zone in an intermediate region, and a third axial zone positioned generally at a top end, wherein the first axial zone has an enrichment greater than the second axial zone and the second axial zone has an enrichment greater than or equal to the third axial zone, the first axial zone, the second axial zone, and the third axial zone having different levels of at least one of average enrichment and average gadolinium doping,
    wherein the one or more fuel rods is a substantial portion of the fuel rods in the fuel assembly.

11. The fuel assembly of claim 10 wherein the enrichment of the first axial zone for a substantial portion of the one or more fuel rods is configured to optimize a local peak power.

12. The fuel assembly of claim 11 wherein a zone length of the second axial zone and a zone length of the third axial zone for a substantial portion of the one or more fuel rods are each dimensioned for optimizing an R-factor.

13. The fuel assembly of claim 10 wherein only the first axial zones of fuel rods about the edge of the fuel assembly are optimized for local peak power.

14. The fuel assembly of claim 10 wherein a zone length of the first axial zone for a substantial portion of the one or more fuel rods is dimensioned for optimizing the first axial zone for a local peak power, and a zone length of the second axial zone and a zone length of the third axial zone for the substantial portion of the one or more fuel rods are each dimensioned for optimizing an R-factor.

15. The fuel assembly of claim 10, further comprising a bottom end axial zone positioned between the bottom end and the first axial zone in a portion of the one or more fuel rods and a top end axial zone positioned between the third axial zone and the top end in the portion of the one or more fuel rods, wherein both the bottom end and top end axial zones include at least one of natural uranium and an enrichment about equal to the enrichment of the first axial zone.

16. The fuel assembly of claim 15 wherein a substantial portion of the fuel rods includes the bottom end and top end axial zones and does not include more than 5 axial zones.

17. The fuel assembly of claim 10 wherein the one or more fuel rods includes two or more groups of fuel rods each having a different combination of enrichments and zone lengths for the first axial zone, the second axial zone, and the third axial zone.

18. The fuel assembly of claim 17 wherein each of the different combinations of enrichments and zone lengths for the two or more groups is configured to optimize a local peak power and an R-factor for the fuel assembly.

19. The fuel assembly of claim 17 wherein only the first axial zones of fuel rods about an edge of the fuel assembly are optimized for local peak power and only the second axial zones and third axial zones of the edge fuel rods are optimized for R-factor.

20. The fuel assembly of claim 10 wherein the substantial portion of the fuel rods in the fuel assembly have no more than three enrichment zones each.

21. A fuel assembly for a nuclear reactor comprising a plurality of fuel rods wherein one or more fuel rods includes a first axial zone positioned generally at a bottom end, a second axial zone positioned adjacent to the first axial zone in an intermediate region, and a third axial zone positioned generally at a top end, wherein the first axial zone is configured to optimize a local peak power of the first axial zone and the second and third axial zones are configured to optimize an R-factor for the fuel assembly, the first axial zone, the second axial zone, and the third axial zone having different levels of at least one of average enrichment and average gadolinium doping.

22. The fuel assembly of claim 21 wherein the enrichment of the first axial zone within the fuel assembly is greater than the enrichment of the second axial zone and is greater than the enrichment of the third axial zone.

23. The fuel assembly of claim 22 wherein the enrichment of the second axial zone within the fuel assembly is greater than or equal to the enrichment of the third axial zone.

* * * * *